(12) United States Patent
Gupta et al.

(10) Patent No.: US 7,957,968 B2
(45) Date of Patent: Jun. 7, 2011

(54) AUTOMATIC GRAMMAR GENERATION USING DISTRIBUTEDLY COLLECTED KNOWLEDGE

(75) Inventors: Rakesh Gupta, Mountain View, CA (US); Ken Hennacy, Columbia, MD (US)

(73) Assignee: Honda Motor Co., Ltd., Tokyo (JP)

( * ) Notice: Subject to any disclaimer, the term of this patent is extended or adjusted under 35 U.S.C. 154(b) by 1015 days.

(21) Appl. No.: 11/609,683

(22) Filed: Dec. 12, 2006

(65) Prior Publication Data

US 2007/0179777 A1 Aug. 2, 2007

Related U.S. Application Data

(60) Provisional application No. 60/753,689, filed on Dec. 22, 2005.

(51) Int. Cl.
*G10L 15/06* (2006.01)
(52) U.S. Cl. .......................... 704/243; 704/244; 704/245
(58) Field of Classification Search .......... 704/243–245; 707/765–768
See application file for complete search history.

(56) References Cited

U.S. PATENT DOCUMENTS

| | | | | |
|---|---|---|---|---|
| 4,914,590 | A * | 4/1990 | Loatman et al. | 704/8 |
| 5,696,962 | A * | 12/1997 | Kupiec | 1/1 |
| 6,199,067 | B1 | 3/2001 | Geller | |
| 6,618,726 | B1 * | 9/2003 | Colbath et al. | 1/1 |
| 6,687,689 | B1 * | 2/2004 | Fung et al. | 1/1 |
| 2004/0030556 | A1 * | 2/2004 | Bennett | 704/270 |
| 2004/0220809 | A1 * | 11/2004 | Wang et al. | 704/257 |

OTHER PUBLICATIONS

Gupta, R., et al., "Common Sense Data Acquisition for Indoor Mobile Robots," AAAI, 2004, p. 605-610, [online] [Retrieved on Aug. 23, 2007] Retrieved from the internet <URL:http://homepages.inf.ed.ac.uk./s0341074/docs/gutpa-kochenderfer-2004-aaai.pdf>.
PCT International Search Report and Written Opinion, PCT/US06/47819, Mar. 19, 2008, 8 Pages.

* cited by examiner

*Primary Examiner* — Richemond Dorvil
*Assistant Examiner* — Douglas C Godbold
(74) *Attorney, Agent, or Firm* — Fenwick & West LLP; Mark E. Duell (57) ABSTRACT

The invention includes a computer based system or method for automatically generating a grammar associated with a first task comprising the steps of: receiving first data representing the first task based from responses received from a distributed network; automatically tagging the first data into parts of speech to form first tagged data; identifying filler words and core words from said first tagged data; modeling sentence structure based upon said first tagged data using a first set of rules; identifying synonyms of said core words; and creating the grammar for the first task using said modeled sentence structure, first tagged data and said synonyms.

22 Claims, 4 Drawing Sheets

Figure 1

Paraphrase

Describe other ways of saying the same thing

To ask someone to wash clothes, one might say [          ]

Teach Open Mind!

Skip

This doesn't make sense

AUTOMATIC GRAMMAR GENERATION USING DISTRIBUTEDLY COLLECTED KNOWLEDGE

RELATED APPLICATIONS

This application claims priority to U.S. Provisional application Ser. No. 60/753,689 filed on Dec. 22, 2005 which is incorporated by reference herein in its entirety.

FIELD OF THE INVENTION

The invention relates to the field of grammar generation and more particularly to the field of automatic grammar generation from a distributed knowledge data source.

BACKGROUND OF THE INVENTION

People often wish to communicate with robots about what they would like done. It is awkward to be constrained to specific set of commands. Therefore, a free-form interface that supports natural human robot interaction is desirable.

A finite state transducer is a finite automaton whose state transitions are labeled with both input and output labels. A path through the transducer encodes a mapping from an input symbol sequence to an output symbol sequence. Grammar is a structure that defines a set of words or phrases that a person is expected to say and the way the words can be or are expected to be combined.

It is a challenge to develop a grammar that will recognize a large variety of phrases and achieve a high recognition accuracy. Manual creation of a set of grammar rules can be very tedious. In many cases, the out-of-grammar rate obtained with hand crafted grammar rules is high because of poor coverage.

In contrast to grammar, a Statistical Language Model (SLM) assigns probabilities to a sequence of words. SLM probabilities are appropriate for recognizing free-style speech, especially when the out-of-grammar rate is high. They are trained from a set of examples, which are used to estimate the probabilities of combinations of words. Training sets for SLM grammars are often collected from users as they interact with the particular application. Over time, the SLM grammar is refined to recognize the statistically significant phrases.

Conventional systems typically define grammar manually. However, this is costly. Other techniques use commercial speech recognition systems that rely on keyword extraction to recognize spoken utterances and can use semantic information to extract associations between the utterance and the knowledge representation. Such techniques can be used for both speech understanding and speech generation. One example of this is Steedman, M., *Wide-coverage Semantic Representations from a CCG Parser*, Proceedings of the 20th International Conference on Computational Linguistics. (2004) that is incorporated by reference herein in its entirety.

Another conventional systems uses transcribed parent-child speech to perform unsupervised learning of linguistic structures from the corpus. See Solan, Z., Horn, D., Ruppin, E., Edelman, S., *Unsupervised Context Sensitive Language Acquisition from a Large Corpus*, http://adios.tau.ac.il/papers/soletalb2003.pdf (2003) which is incorporated by reference herein in its entirety. In this example, significant patterns of words are extracted and are represented in trees to generalize to variations in unseen text. In other system a generative probabilistic model is used for unsupervised learning of natural language syntactic structure. However, such systems do not learn a context free grammar (CFG) but, rather, induce a distributional model based on constituent identity and linear context.

A conventional grammar generation system collects structured transcripts from Wizard of Oz based user tests. Participants spoke instructions and a wizard (real person through Microsoft NetMeeting tool) captured the spoken phrase in a transcript and manually performed the requested email management task. With text parsing, they generated the Context Free Grammar (CFG). This approach required labor intensive transcript collection and the scope was limited to only a few tasks. See Sinha, A. K., Landay, J. A., *Towards Automatic Speech Input Grammar Generation for Natural Language Interfaces*, CHI 2000 Workshop on Natural Language Interfaces, The Hague, The Netherlands (2000) which is incorporated by reference herein in its entirety.

Another system implemented an automated customer service agent to interact with users wanting to browse and order items from an online catalog. A small representative set of utterances (on the order of hundreds of sentences or phrases) was combined with an overly permissive grammar to generate a tighter grammar for the domain. This approach required tagging of lexical entries and manual writing of rules to enforces semantic restriction among lexical entries. Such a system is described in greater detail in Martin, P., *The Casual Cashmere Diaper Bag: Constraining speech recognition Using Examples*, Proceedings of the Association of Computational Linguistics. (1997) which is incorporated by reference herein in its entirety.

Among free-form recognition approaches using a grammar, another system uses a system based on recognizing commonly used phrases instead of words in order to categorize responses to an open ended prompt How may I help you? They evaluated and selected phrases via perplexity minimization and clustered them using a similarity metric. Such a system is described in Riccardi, G., Bangalore, S., *Automatic Acquisition of Phrase Grammars for Stochastic Language Modeling*, 6th Workshop on Very Large Corpora, Montreal (1998) 186-198 which is incorporated by reference herein in its entirety.

What is needed is a system and method to automate the process of creating a grammar, e.g., a Finite State Grammar Transducer (FSGT), that maps utterances to task labels from text data contributed by volunteers over the web. Since multiple users on the web contribute knowledge it is likely to have better coverage than contributions by a small number of people exhaustively thinking of ways to ask the robot to perform a particular task.

SUMMARY OF THE INVENTION

The invention includes a computer based system or method for automatically generating a grammar associated with a first task comprising the steps of: receiving first data representing the first task based from responses received from a distributed network; automatically tagging the first data into parts of speech to form first tagged data; identifying filler words and core words from said first tagged data; automatically modeling sentence structure based upon said first tagged data using a first set of rules; automatically identifying synonyms of said core words; and automatically creating the grammar for the first task using said modeled sentence structure, first tagged data and said synonyms.

The features and advantages described in the specification are not all inclusive and, in particular, many additional features and advantages will be apparent to one of ordinary skill in the art in view of the drawings, specification, and claims.

Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 1:
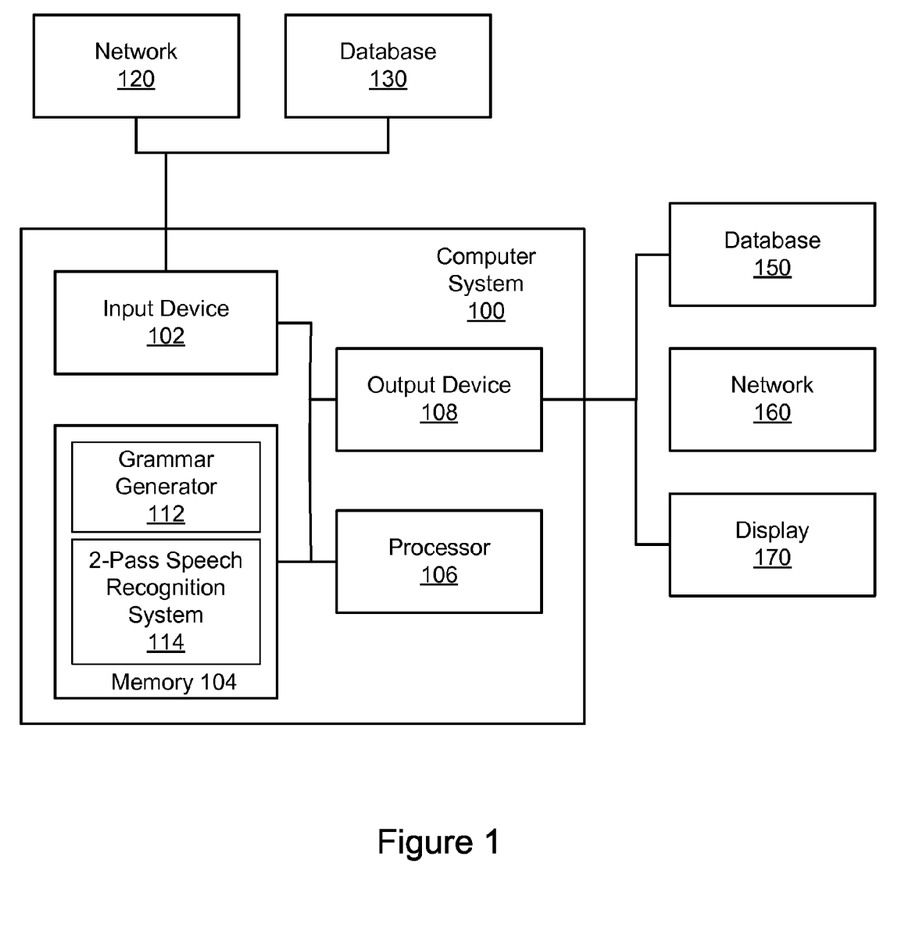
FIG. 1 is a computer system according to one embodiment of the present invention.

FIG. 1 is a computer system according to one embodiment of the present invention. The computer system 100 includes an input device 102, a memory 104, a processor 106, and an output device 108. The input device 102 is coupled to a network 120, a database 130, and an image capture unit 140. The output device 108 is coupled to a database 150, a network 160, and a display 170. The networks 120, 160 can be the same and the databases 130, 150 can be the same. A grammar generator 112 and a two-pass speech recognition system 114 can be included in the memory 104 and executed by the processor 106. In other embodiments, the input device is connected to only one or two of a network 120 and a database 130. In yet another embodiment, the input device may be connected to any device configured to input data to the computer system. Similarly, in some embodiments, the output device may be connected to one or more of a database 150, network 160, display 170 or any other device cable of receiving outputted data. In another embodiment, the computer system comprises one or more processors 106 or other specialized processors.

Commonsense may be gathered from non-specialist users of the Internet in a similar fashion as are the projects associated with the OpenMind Initiative, which is described in greater detail in Stork, D. G., *Open Data Collection for Training Intelligent Software in the Open Mind Initiative*, Proceedings of the Engineering Intelligent Systems (EIS2000), Paisley, Scotland (2000) which is incorporated by reference herein in its entirety. OpenMind Indoor Common Sense (OMICS) is an internet-based distributed knowledge capture framework that is used to capture knowledge from web users into a relational database schema. This is described in greater detail in Gupta, R., Kochenderfer, M., *Common Sense Data Acquisition for Indoor Mobile Robots*, Nineteenth National Conference on Artificial Intelligence (AAAI-04) (2004), which is incorporated by reference herein in its entirety. This common sense knowledge is acquired from user responses to questions, for example, in a fill-in-the-blank format. A purpose of the OMICS project is to capture knowledge about indoor home and office environments into a form useful for reasoning about common household/office tasks. The OMICS project has successfully captured thousands of text phrases of commonsense knowledge about home and office environments. A distinguishing characteristic of this approach is in the restriction of the domain to indoor home and office environments. This restriction makes the knowledge base dense for statistical processing. Although in alternate embodiment the invention can be applied to different environments and tasks.

Figure 2:
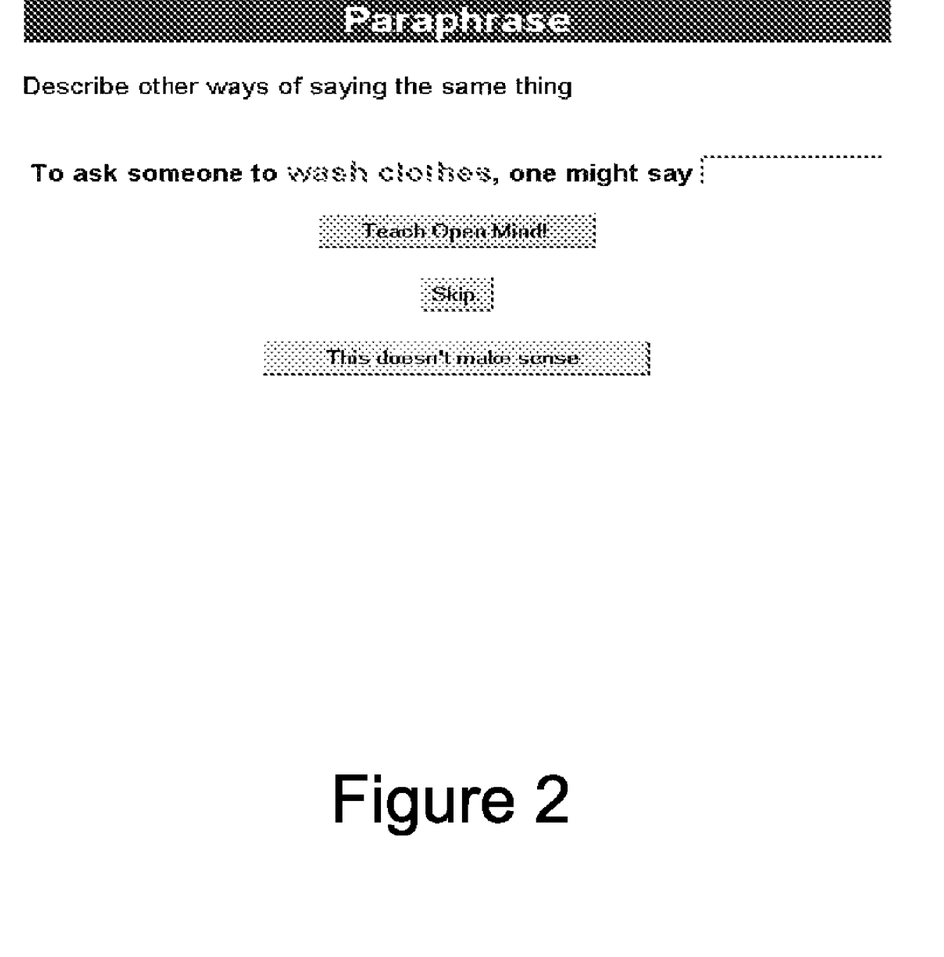
FIG. 2 is an example of a paraphrase option in the Open-Mind Indoor Common Sense system which can be used in accordance with one embodiment of the present invention.

Paraphrases are alternative ways of conveying the same information. In one embodiment, the invention uses "paraphrase" entries from the OMICS database. FIG. 2 is an example of a paraphrase option in the OpenMind Indoor Common Sense system which can be used in accordance with one embodiment of the present invention. In FIG. 2 an OpenMind prompt for the paraphrase activity with a possible answer is shown. In this example a paraphrase prompt asks the question: "To ask someone to wash clothes, one might say ______." Another example is: "To ask someone to make coffee, one might say ______."

Data collected from users in a distributed manner is inherently noisy. It contains spelling errors as well as completely out-of-context responses. More commonly, user data often relies upon implied associations, i.e., the commonsense understanding of what is being referred to within a sentence. An example of an implied association is: To ask someone to cook pasta, one might say I am hungry. Such a paraphrase is ambiguous as it could imply a wide range of tasks including heating food, getting food from a refrigerator, and cooking vegetables. These implied associations and other low-value data are typically removed in OMICS by manual review which takes place before any knowledge is committed to the database.

Figure 3:
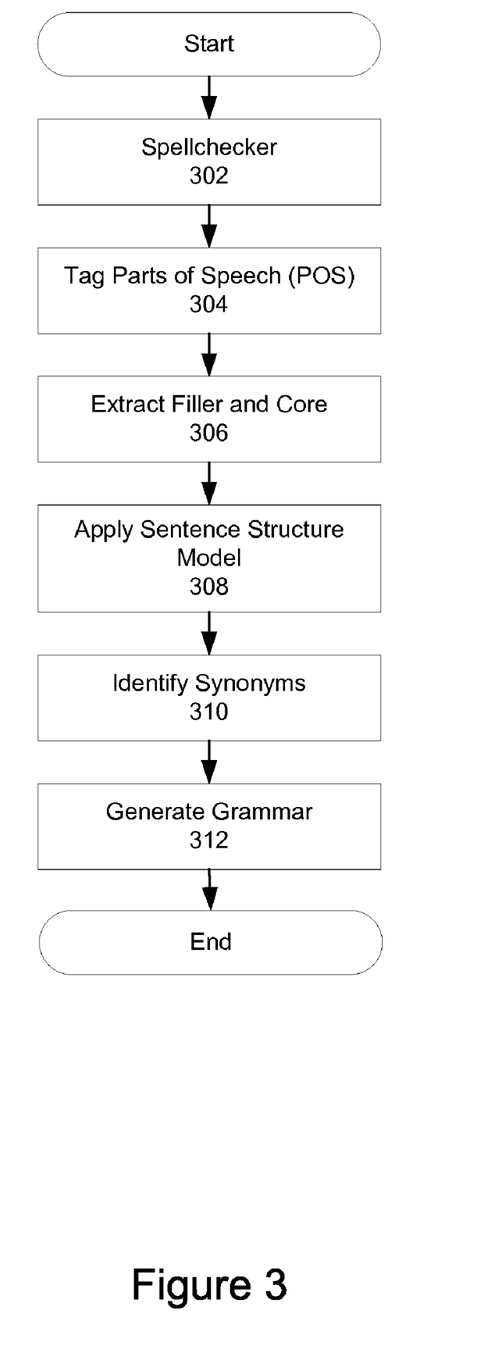
FIG. 3 is a flowchart of the automatic grammar generation process in accordance with one embodiment of the present invention.

FIG. 3 is a flowchart of the automatic grammar generation process in accordance with one embodiment of the present invention. The grammar generator 112 connects to an OpenMind Indoor Common Sense database and reads the paraphrasing data. Then the data is sent 302 to a spelling checker to correct the spellings using, for example, WinterTree spelling checker software. Next the part of speech (POS) of the data is tagged 304 and core and filler words in each phrase are identified 306. Then the grammar generator 112 categorizes 308 the sentence structures and constructs grammar, e.g., Finite State Grammar Transducer (FSGT) models, using these structures. Appropriate synonyms, for example from WordNet and/or a thesaurus are identified 310. Phrases that contain matches to synonyms are used to generate a hierarchical grammar consisting of filler and core parts. These steps are described in more detail below.

As described above after receiving the paraphrasing data and checking 302 the spelling, the grammar checker 114 tags 304 the parts of speech of the data. One example of a type of parser that can be used to tag data is described in Liu, H., Montylingua: *An end-to-end natural language processor with common sense*, web.media.mit.edu/hugo/montylingua (2004) which is based on Brill, E., *A simple Rule-based Part-of-speech Tagger* Proceedings of ANLP-92, 3rd Conference on Applied Natural Language Processing, Trento, IT (1992) 152-155 which are both incorporated by reference herein in their entirety. An example of a parsed user request is:

make/VB coffee/NN

Here VB is the notation for verb and NN is the notation for a noun. A grammar typically consists of a core portion that contains the most significant information bearing words (the requested task) and a filler portion that contains additional expressions such as "I'd like you to" or "please." The grammar generator 112 extracts 306 these filler and core words using rules. Example of these rules are: (1) find all words that occur more than N times, e.g., N=10; find all first two words that occur more than N times, e.g., N=10, (3) find all first three words that occur more than N time, e.g., N=10. These results can be manually screened to remove incorrect filler words. Another automatic way to clean this resulting list is to remove all single word verbs other than "please."

In one embodiment, filler words are combined across all tasks that the robot can perform, but core words are processed separately for each task. In alternate embodiments both filler and core words are processed separately for each task.

In one embodiment the grammar generator 112 uses a hierarchical grammar to combine filler and core words within the FSGT. The filler portion is reusable across all tasks, and is defined using a high-level grammar. Core words that pertain to the task are added in a sub grammar. This sub grammar is embedded in the high-level task grammar. Another example of a parsed user request is:

can/MD you/PRP prepare/VB coffee/NN.

In this example MD refers to a modal verb, PRP refers to a preposition. Here "can you" is the filler and "prepare coffee" is the core. For the short user request phrases that are of interest for robot commands, the Brill tagging is correct approximately 85% of the time.

User requests can be broadly classified as imperative statements. Sentences with imperative structure often begin with a verb phrase and have no subject. They are called imperative because they are almost always used for commands and suggestions.

In one embodiment of the present invention, the grammar generator 112 presumes that the phrase has at least one verb and one noun. The grammar generator 112 models 308 the adverb modifiers in the command, e.g., "turn on television," but we do not model 308 the prepositional phrase (PP). For example "in the sink" in the command "put the dishes in the sink" is not modeled. The prepositional phrase provides additional information which is useful for correct command execution, but is less relevant for command recognition. When modeling 308, the grammar generator 112 uses rules to match among different sentence structures. For example, phrases with the structure:

VP→Verb Adverb NP and VP→Verb NP Adverb are equivalent if the words with the same parts of speech are synonyms (or same) in the two candidate phrases. Examples of a user request that fit the above grammar are "pick up object" and "pick object up" where VP means verb phrase.

These rules can be derived from the data by a frequency analysis of the POS trigrams and can be automated.

Generally two people typically choose the same name for a single well-known object less than 20% of the time. Hence it is advantageous to use synonyms to make the system vocabulary independent. The grammar generator 112 uses lexical resources like WordNet and Thesaurus to identify 310 synonyms. For sentence structure S→VB NN, an example user request is:

makeNVB coffee/NN

The verb in the request is "make" and the noun is "coffee." In one embodiment, from all paraphrases we select 310 those where both the noun and the verb match the WordNet/Thesaurus synonym list. In alternate embodiments different criteria can be used.

For noun phrases, there are different ways of matching synonyms. In one embodiment the grammar generator 112 accepts general-to-specific matching between a noun in the NP (Noun Phrase) and the WordNet and thesaurus synonym list. For example, "coffee" matches "black coffee" and "cup of coffee."

The grammar generator 112 then generates 312 the grammar for a task based upon the paraphrases. An example of how this is done is set forth below using a sample of ten of the paraphrases in the database for the "make coffee" user request (task) in the OMICS database as shown in Table 1.

TABLE 1

| | |
|---|---|
| 1. | please/VB make/VB coffee/NN |
| 2. | make/VB java/NN |
| 3. | prepare/VB coffee/NN |
| 4. | fix/VB me/PRP a/DT cup/NN of/IN coffee/NN |
| 5. | prepare/VB a/DT coffee/NN |
| 6. | need/NN coffee/NN |
| 7. | make/VB some/DT joe/NN |
| 8. | brew/VB coffee/NN |
| 9. | bring/VB coffee/NN |
| 10. | I/PRP 'd/MD like/RB to/TO have/VB coffee/NN |

In one embodiment the grammar generator 112 generates an initial grammar based upon the task, e.g., the grammar for "make coffee" can be that shown in equation (1) where "FILLER" is the list of filler words found by a statistical analysis of all filler words found in the paraphrasing entries, as described above. It consists of phrases like please, can you etc. "[ ]" represents an OR clause while "( )" represents an AND clause. "?" indicates optional words that may or may not be present in the utterance. In another embodiment, filler, e.g., "I'd like to" in paraphrase ten is identified and removed prior to using the tagged paraphrases to generate the grammar.

$$?FILLER[make][coffee] \qquad (1)$$

The grammar generator 112 then analyzes the first paraphrase and modifies the grammar for this task to that shown in equation (2).

$$?FILLER[make][coffee] \qquad (2)$$

That is, since in this embodiment the optional filler was already part of the initial grammar, no change was made to the grammar based upon the paraphrase 1 in table 1.

The grammar generator 112 then analyzes the second paraphrase and modifies the grammar for this task to that shown in equation (3).

$$?FILLER[make][coffee\ java] \qquad (3)$$

The grammar generator 112 identified 312 "java" as a synonym to "coffee" and modified the grammar accordingly.

The grammar generator 112 then analyzes the third paraphrase and modifies the grammar for this task to that shown in equation (4).

$$?FILLER[make\ prepare][coffee\ java] \qquad (4)$$

The grammar generator 112 identified 312 "prepare" as a synonym to "make" and modified the grammar.

The grammar generator 112 then analyzes the fourth paraphrase and modifies the grammar for this task to that shown in equation (5).

$$?FILLER[fix\ make\ prepare]?(me\ a)[(cup\ of\ coffee)\ coffee\ java] \qquad (5)$$

The grammar generator 112 identified 312 "fix" as a synonym to "make" and also modified the grammar to include the optional phrase "me a."

The grammar generator 112 then analyzes the fifth paraphrase and modifies the grammar for this task to that shown in equation (6).

$$?FILLER[fix\ make\ prepare]?a\ ?(me\ a)[(cup\ of\ coffee)\ coffee\ java] \qquad (6)$$

The grammar generator 112 modified the grammar to include the optional phrase "a".

The grammar generator 112 then analyzes the sixth paraphrase. However, in this example the word "need" is incorrectly tagged as a noun, therefore this paraphrase does not have a tagged verb and is accordingly not used to modify the grammar. The grammar generator 112 then analyzes the seventh paraphrase. In this example the word "joe" is not identified as a synonym of coffee and therefore this paraphrase is not used in the generation of the grammar. Similarly, paraphrases eight, nine and ten are not used to generate the grammar because the words "brew," "bring" and "have" are not synonyms of "make" in this example.

Accordingly, in this example, the grammar rule for "make coffee" based upon the paraphrases in table 1 is shown in equation (7).

$$(?FILLER[fix\ prepare\ make]?a?(me\ a)[Java\ coffee\ (cup\ of\ coffee)])return\ "make\ coffee" \qquad (7)$$

The slot value "make coffee" returned from the grammar indicates the requested task.

In alternate embodiments, the number of paraphrases that can be used can be improved by using data in remaining tasks and allowing synonyms that do not currently exist in Word-Net/Thesaurus, e.g., the word "brew" in the above example.

A benefit of the above technique is that it is scalable and the grammar generator 112 can handle large number of phrases to generate the FSGT.

In one embodiment of the present invention the grammar generator 112 can be used independently of any other system, but the grammar generator can also be used in conjunction with other techniques. For example, in another embodiment another grammar model can also be trained by the OMICS paraphrase statements. One example is a probabilistic finite state grammar (PFSG) referred to as an n-gram Statistical Language Model (SLM). A 3-gram SLM is trained from the corpus of paraphrasing data contained in the OMICS database. The SLM model captures the frequency of different words in the grammar.

Figure 4:
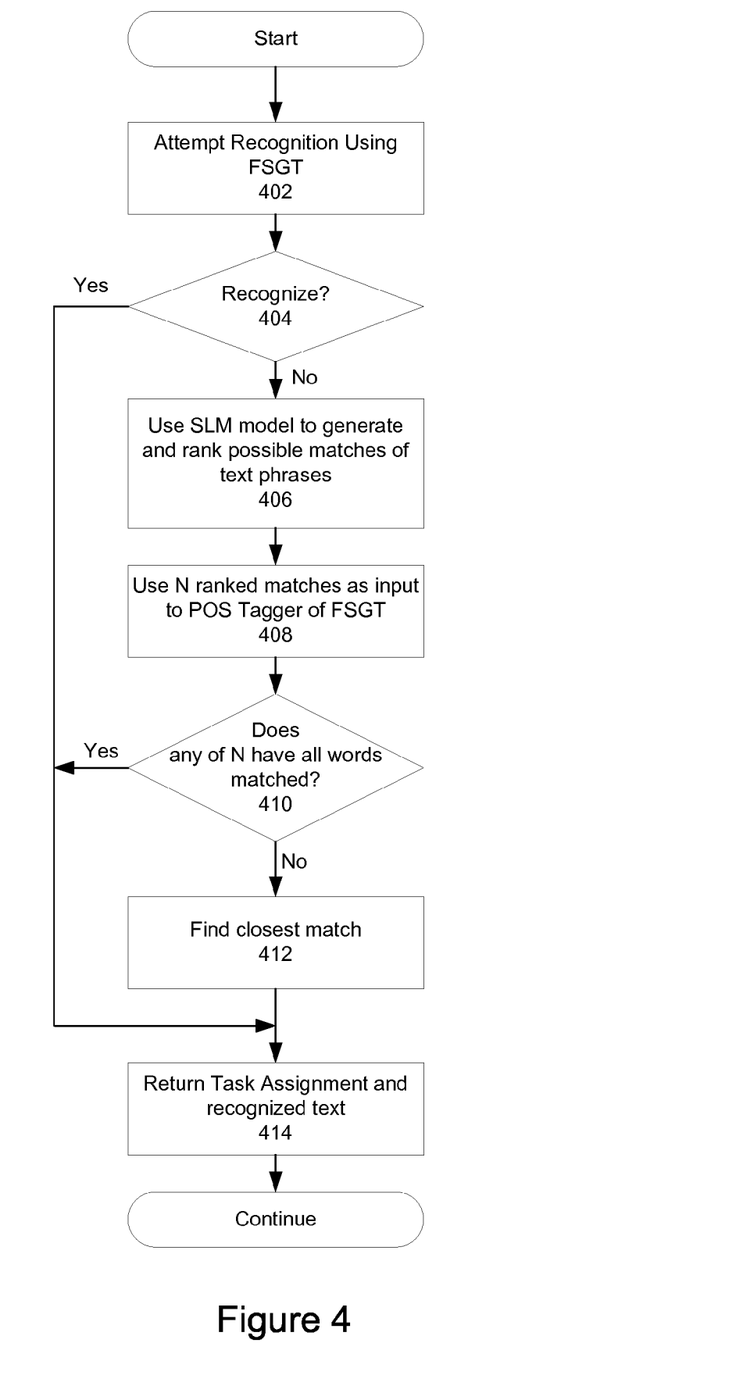
FIG. 4 is a flowchart of a two-pass method for speech recognition in accordance with one embodiment of the present invention.

In one embodiment of the present invention that utilizes a two pass method for speech recognition, SLM recognized text is first processed using the FSGT to find the requested task via slot assignments. If the utterance is not recognized, a POS speech tagger, e.g., the POS tagger described above, is used for out-of-grammar recognition of keywords. With background noise and variations in voice and grammar, FSGT and SLM grammars individually may not match a spoken utterance. However the combination of the two approaches in a two pass system generally increases accuracy. There are several reasons for this.

The statistical n-gram model is expected to perform better than the FSGT model in some ways. While the FSGT model is very strict in terms of the possible combinations of words that can be recognized, the SLM model is not as restrictive. With certain speakers, FSGT has difficulty because it is too restrictive. On the other hand, the statistical n-gram model has difficulty because too many phrases that sound similar to the utterance get chosen. Upon combining the two models, however, statistical n-gram model picks candidate phrases and FSGT discards the nonsensical and non grammatical phrases leading to a correct match.

FIG. 4 is a flowchart of a two-pass method for speech recognition in accordance with one embodiment of the present invention. The two pass speech recognition system 114 attempts 402 to recognize the task using the FSGT approach, described above with reference to the grammar generator 112. If a FSGT is matched 404, the corresponding task assignments and recognized text is returned 414. If there is not an exact match of a spoken utterance, then an SLM model is used 406 in the second pass to generate and rank possible matching word phrases. In one embodiment, the threshold for recognition is set low to include the capture of out-of-grammar utterances. The "N" ranked extracted word phrases are sent 408 through the tagging POS portion of the FSGT (grammar generator 112). In one embodiment, the ranked matches are iteratively selected starting with the best match. If 410 a match for all words is found then the task assignment and recognized text are returned 414. If 410 a match for all words is not found, the closest match is identified 412 and the task and recognized text based upon the closes match is returned 414. The closest match can be identified in a variety of ways. For example, matches can be identified based upon several criteria involving keywords (verbs and nouns), their confidence numbers, and their expression within the most probable phrase.

In experiments, for the first pass, the threshold was set for the FSGT model to be high (60%). For 85% of the phrases, the correct task request was captured and the slot assignments have a high accuracy rate when recognition occurs. If no slots are returned, the N highest ranked text phrases returned by the SLM model are reviewed. In this experiment, the confidence threshold was set low (20%) for this second pass of the speech recognition process, in order to generate numerous hypotheses. These low threshold hypotheses rarely match the FSGT, but are useful for matching out-of-grammar speech.

The two-pass methodology gives us a 96% recognition rate compared to 85% with FSGT alone (the 3.4% errors are in tagging). This two-pass methodology can optionally be used to increase the recognition performance of the SLM grammar for in-grammar phrases. High performance of the two-pass approach is due in part to the acceptance criteria introduced by passing candidate phrases from the SLM hypothesis generator through the FSGT model to eliminate nonsensical statements.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer based method for automatically generating a hierarchical grammar associated with a plurality of tasks comprising the steps of:
    creating a sub-grammar for each of the plurality of tasks, wherein creating a sub-grammar for a task comprises:
        receiving data representing the task based from responses received from a distributed database;
        automatically tagging the data into parts of speech to form tagged data using a processor executing instructions included in a memory coupled to the processor;
        identifying filler words and core words from said tagged data by applying rules to differentiate between filler words and core words using the processor executing instructions included in the memory coupled to the processor;
        automatically modeling sentence structure based upon said tagged data using a set of modeling rules retrieved from the memory coupled to the processor;
        automatically identifying synonyms of said core words; and
        automatically creating a sub-grammar using the modeled sentence structure, the tagged data, the identified synonyms, and the identified core words; and
    creating a high-level grammar by combining filler words identified in the creation of the sub-grammars.

2. The method of claim 1, further comprising the step of checking the spelling of words in said data.

3. The method of claim 1, wherein said hierarchical grammar is combined with a statistical language model to recognize speech.

4. The method of claim 1, wherein said hierarchical grammar is used to recognize speech.

5. The method of claim 1, wherein said data represents a request to perform said first task.

6. The method of claim 1, wherein said data is received using the Internet.

7. The method of claim 1, wherein said parts of speech include verbs and nouns.

8. The method of claim 1, wherein said data is received using an internet-based distributed knowledge capture system.

9. The method of claim 8, wherein said internet-based distributed knowledge capture system is an OpenMind indoor common sense knowledge capture system.

10. The method of claim 1, further comprising the step of identifying synonyms of the identified filler words.

11. The method of claim 1, wherein the high-level grammar is created concurrently with the creation of sub-grammars.

12. A computer based system for automatically generating a hierarchical grammar associated with a plurality of tasks comprising:
    creation means for creating a sub-grammar for each of the plurality of tasks, wherein the creation means comprises:
        receiving means for receiving data representing the task based from responses received from a distributed database;
        tagging means for automatically tagging the data into parts of speech to form tagged data;
        identification means for identifying filler words and core words from said tagged data by applying rules to differentiate between filler words and core words;
        modeling means for automatically modeling sentence structure based upon said tagged data using a set of modeling rules;

synonym means for automatically identifying synonyms of said core words; and grammar means for automatically creating a sub-grammar using the modeled sentence structure, the tagged data, the identified synonyms, and the identified core words; and creation means for creating a high-level grammar by combining filler words identified in the creation of the sub-grammars.

13. The system of claim 12, further comprising:

checking means checking the spelling of words in said data.

14. The system of claim 12, wherein said hierarchical grammar is combined with a statistical language model to recognize speech.

15. The system of claim 12, wherein said hierarchical grammar is used to recognize speech.

16. The system of claim 12, wherein said data represents a request to perform said task.

17. The system of claim 12, wherein said data is received using the Internet.

18. The system of claim 12, wherein said parts of speech include verbs and nouns.

19. The system of claim 12, wherein said data is received using an internet-based distributed knowledge capture system.

20. The system of claim 19, wherein said internet-based distributed knowledge capture system is an OpenMind indoor common sense knowledge capture system.

21. The system of claim 12, further comprising:

filler synonym means for identifying synonyms of the identified filler words.

22. The system of claim 12, wherein the high-level grammar is created concurrently with the creation of sub-grammars.

* * * * *